United States Patent [19]

Gillick

[11] Patent Number: 4,914,703

[45] Date of Patent: Apr. 3, 1990

[54] METHOD FOR DERIVING ACOUSTIC MODELS FOR USE IN SPEECH RECOGNITION

[75] Inventor: Laurence Gillick, Newton, Mass.

[73] Assignee: Dragon Systems, Inc., Newton, Mass.

[21] Appl. No.: 938,545

[22] Filed: Dec. 5, 1986

[51] Int. Cl.[4] .............................................. G10L 5/06
[52] U.S. Cl. ......................................... 381/43; 381/41
[58] Field of Search ................. 381/41, 42, 43, 45-53; 364/513.5

[56] References Cited

U.S. PATENT DOCUMENTS 3,969,700  7/1976  Bollinger et al. ..................... 381/43
4,408,434  12/1984  Moshier ................................. 381/43

OTHER PUBLICATIONS

Carl Morris and John Rolph, "Introduction to Data Analysis and Statistical Inference", 1981, Chapter 12, The Rand Corporation.

Arthur Nadas, "On Turning's Formula for Word Probabilities", IEEE Trans. on Acoustics, Speech, and Signal Processing, pp. 1414–1416, vol. 33, No. 6, Dec. 12/85.

Primary Examiner—William M. Shoop, Jr.
Assistant Examiner—Brian K. Young
Attorney, Agent, or Firm—Edward W. Porter

[57] ABSTRACT

The invention provides a method of deriving generally improved statistical acoustic model of a first class of speech sounds, given a limited amount of sampling data from that first class. This is done by combining a first statistic calculated from samples of that class of speech sounds with a corresponding second statistic calculated from samples of a second, broader, class of speech sounds. Preferably the second statistic is calculated from many more samples than the first statistic, so it has less sampling error that the first statistic, and preferably the second class is a super-set of the first class, so that the second statistic will provide information about the first class. In one embodiment, the invention combines statistics from the models of a plurality of first classes of speech sounds to reduce the sampling error of such statistics and thus improve the accuracy with which such models can be divided into groups of similar models. The first and second statistics can be measurements of spread, of central tendency, or both. They also can relate to different types of parameters, including spectral parameters and parameters representing the duration of speech sounds.

24 Claims, 9 Drawing Sheets

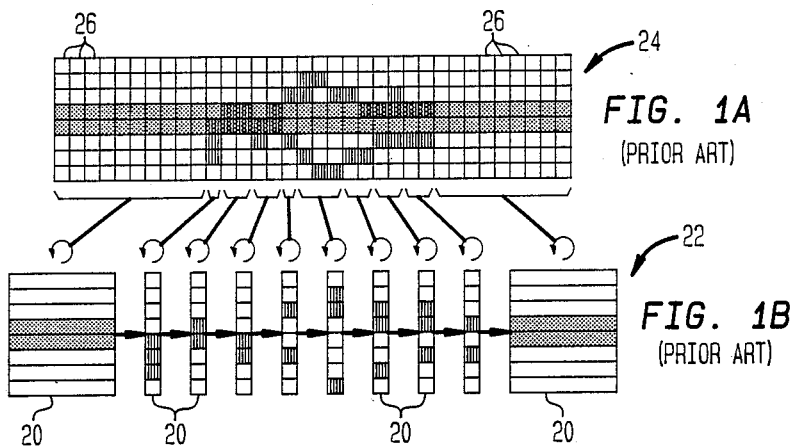
FIG. 1A (PRIOR ART)
FIG. 1B (PRIOR ART)
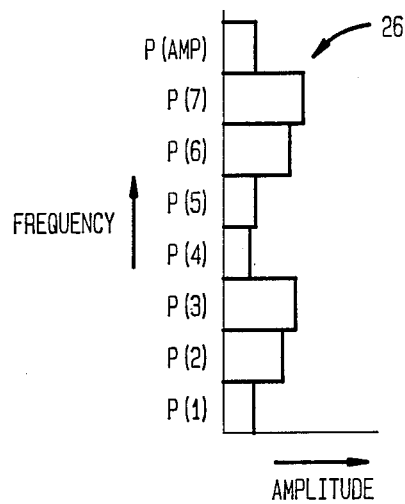
FIG. 2A (PRIOR ART)
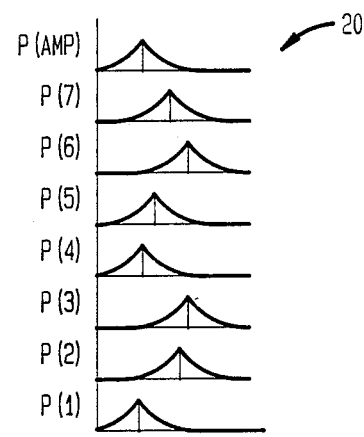
FIG. 2B (PRIOR ART)
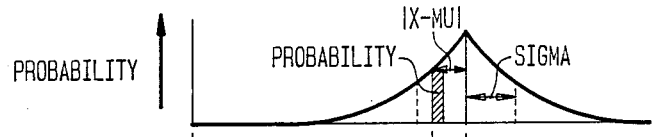
FIG. 3A (PRIOR ART)
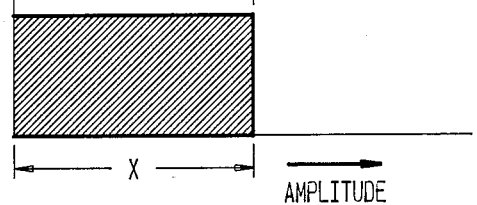
FIG. 3B (PRIOR ART)

METHOD FOR DERIVING ACOUSTIC MODELS FOR USE IN SPEECH RECOGNITION

FIELD OF THE INVENTION

The present invention relates to improving statistical models of speech sounds used in speech recognition. Such models are compared against portions of speech to be recognized to determine the likelihood that each such portion corresponds to the sounds represented by each model. The invention provides a method for improving the statistical accuracy of such models when there is insufficient sampling of the class of sounds represented by each such model to accurately estimate statistics of that class.

BACKGROUND OF THE INVENTION

Many speech recognition systems operate by comparing acoustic models of known words, or parts of words, against acoustic descriptions of speech to be recognized. They recognize the speech by identifying with it those words, or parts of words, whose models compare most closely with its description. In many such systems, digital signal processing converts the analog signal of an utterance to be recognized into a sequence of frames. Each such frame is a group of parameters associated with the analog signal during a brief period of time. Commonly the parameters represent the amplitude of the speech at each of a plurality of frequency bands. Such speech recognition systems commonly compare the sequence of frames produced by the utterance against a sequence of acoustic models, each of which has a model of the parameter values of frames associated with a given speech sound.

An example of such a speech recognition system is given in U.S. patent application Ser. No. 797,249, filed by Baker et. al. on November 12th, 1985, for "Speech Recognition Apparatus and Method" (hereinafter referred to as "application Ser. No. 797,249"). Application Ser. No. 797,249 is assigned to the assignee of the present application and is incorporated herein by reference. It discloses a system in which each vocabulary word is represented by a sequence of statistical node models. Each such node model is a multidimensional probability distribution, each dimension of which represents the probability distribution for the values of a given frame parameter if its associated frame belongs to the class of sounds represented by the node model. Each dimension of the probability distribution is represented by two statistics, an estimated expected value, or mu, and an estimated absolute deviation, or sigma.

A method for deriving statistical models of the basic type discussed in application Ser. No. 797,249 is disclosed in U.S. patent application Ser. No. 862,275, filed by Gillick et al. on May 12th, 1986, for "A Method For Representing Word Models For Use In Speech Recognition" (hereinafter referred to as "application Ser. No. 862,275"). Application Ser. No. 862,275 is assigned to assignee of the present application, and is incorporated herein by reference. It discloses how to divide multiple utterances of the same word into corresponding groups of frames, called nodes, which represent corresponding sounds in the different utterances of the word, and to derive a statistical model of the type described above for each such node. In addition application Ser. No. 862,275 discloses how to divide the nodes from many words into groups of nodes with similar statistical acoustic models, and how to calculate a statistical acoustic model for each such cluster. The model for a given cluster is then used in place of the individual node models from different words which have been grouped into that cluster, greatly reducing the number of models which have to be stored. The use of such clusters also greatly reduces the number of words a new user has to speak in order to train up a large vocabulary speech recognition system, since the user is only required to speak enough words to train a model for each cluster, rather than being required to separately speak, and train up a model for, each word in the recognition system's vocabulary.

Although the methods of deriving and using statistical node and cluster models described in application Ser. Nos. 797,249 and 862,275 work well, it is still desirable to improve their performance. One problem with such statistical models is that the mu's and sigma's used for their parameters are only estimates. The estimated mu and estimated sigma for a given parameter of such a model are derived from a finite number of samples of the frames associated with the node or cluster which the models represent. The mu of a given parameter is the mean of that parameter over all frames used to calculate the model, and the sigma is the absolute deviation of that parameter over all such frames.

In order for such estimates to be accurate, they should be based on a very large sampling of acoustic data. Unfortunately, it is often undesirably expensive or undesirably inconvenient to obtain a large enough sampling of the speech sounds associated with the model to make its mu's and sigma's as accurate as desirable. It would normally take many thousands of utterances of each node or cluster to derive truly accurate statistics for its model. But the requirement of so many training utterances would make the initial use of speech recognition systems much more difficult. For this reason such systems normally operated with models derived from insufficient data, causing the performance of such systems to suffer.

The statistical inaccuracy of acoustic models has other undesirable effects. For example, when acoustic models of nodes, that is, successive parts of individual words, are divided into clusters of the nodes with similar acoustic models, as described in application Ser. No. 862,275, inaccuracies in the statistics of node models due to insufficient sampling data increases the chance that individual nodes will be put into the wrong clusters, or will be put into separate clusters all by themselves when they should not be. This makes the clustering process less accurate and less efficient.

Such statistical inaccuracies can also causes problems when cluster models of the type described in application Ser. No. 862,275, which are derived by having an end user speak each cluster in a small number of words, are used to recognize the sound represented by that cluster in a much larger number of words. This results both from the small number of frames from which each cluster is derived and from the fact that speech sounds are often varied by the context in which they are said, and thus that the statistics of a cluster model tend to be less accurate when they are derived from utterances of a small number of words than when they are derived from utterances of all the words in which the cluster is used.

SUMMARY OF THE INVENTION

It is an object of the present invention to provide a method for deriving generally more accurate statistical acoustic models for use in speech recognition.

More particularly, it is an object of the present invention to provide such a method for deriving generally more accurate statistical models without increasing the total amount of data which must be sampled.

Furthermore, it is an object of the present invention to provide a method for deriving generally more accurate statistical models of individual parts of individual words.

It is yet another object of the present invention to provide a method for deriving generally more accurate statistical models of common sounds which occur in parts of more than one word.

It is still another object of the present invention to provide a method which generally increases the accuracy of acoustic models of nodes, that is the successive sounds of individual words, before such nodes are divided into clusters of similar nodes, so as the increase the accuracy of the resulting clusters and reduce the total number of clusters formed.

It is yet another object of the present invention to provide a method for deriving generally more accurate statistical models of how a given user speaks a given speech sound in a large number of words, without requiring that user to speak more than a small subset of that large number of words.

The present invention provides a method of deriving an acoustic model of a first class of speech sounds, which is to be compared against portions of speech to be recognized, to determine the likelihood that the portion corresponds to the first class of speech sounds. The method includes calculating a first statistic derived from one or more samples of the first class of speech sounds; providing a corresponding second statistic calculated from samples of a second class of speech sounds, including samples of sounds not in the first class of speech sounds; and calculating a combined statistic, for use in the acoustic model of the first class of speech sounds, which is a weighted combination of the first and second statistics.

In most embodiments the first statistic is calculated from many fewer samples than the second statistic, and the first set of speech sounds is a subset of the second class of speech sounds. In some embodiments the first class of speech sounds corresponds to one speech unit, that is, to a given sound occurring in part of one or more words, and the second class of speech sounds corresponds to a plurality of such speech units. In one such embodiment, the first class corresponds to a speech unit associated with a certain part of a certain word, and the second class corresponds to speech units associated with different parts of different words. Preferably there are a plurality of such first classes, each corresponding to a speech unit associated with a given part of one of a plurality of words, and a first statistic is calculated for each of them. In such an embodiment the second class of speech sound encompasses all the first classes, a combined statistic is calculated for the model of each of the first classes, the models of the first classes are then divided into clusters of similar models, and an acoustic model is calculated for each such cluster.

In another embodiment of the present invention, the first class of speech sounds includes sounds spoken by one or more speakers from a small group of speakers, and the second class of speech sounds includes sounds spoken by a larger group of speakers. Preferably the first and second classes corresponds to the same speech unit spoken by different groups of speakers.

In some embodiments, the first and second statistics are both measurements of spread; in some embodiments they are both measurements of central tendency; and in some embodiments first and second statistics are calculated and combined for both measurements of spread and measurements of central tendency. In some embodiments of the invention, the first and second statistic relate to spectral parameters, and in others they relate to other parameters such as the duration of speech sounds.

According to one embodiment of the present invention, a method is provided for deriving an acoustic model of how a given speech unit is spoken by a small group of speakers. The small group speaks one or more utterances of a first group of vocabulary words. The acoustic data from these utterances is time aligned against a model of that vocabulary word comprised of a sequence of acoustic models representing how the speech units normally contained in the word are spoken by a larger group of people. A first statistic is calculated for the speech unit from data spoken by the small group that has been time aligned against the large group's acoustic models for that speech unit. Then a combined statistic is calculated for the small groups' model of that speech unit by taking a weighted combination of the first statistic and a corresponding second statistic contained in the large group's model for that speech unit.

In a preferred version of this embodiment, the small group speaks utterances of the given speech unit in a small number of vocabulary words, and the large group's model of the speech unit is derived from utterances of that speech unit in a much larger number of vocabulary words. As a result, the combined statistic is derived both from how the small group says the speech unit in a small number of words and how the large group says the same speech unit in a large number of words.

DESCRIPTION OF THE DRAWINGS

These and other aspects of the present invention will become more clear upon reading the following description of the preferred embodiments in conjunction with the accompanying drawings, in which:

FIG. 1A is a schematic representation of a sequence of acoustic frames representing speech to be recognized; FIG. 1B is a schematic representation of a word model comprised of a sequence of statistical acoustic models; and together FIGS. 1A and 1B represent the time alignment and comparison of the frames to be recognized against the acoustic model of a word to determine if those frames correspond to that word;

FIG. 2A is a schematic representation of an individual frame of the type shown in FIG. 1A, showing that it is a vector of parameter values; and FIG. 2B is a schematic representation of an individual acoustic model of the type shown in FIG. 1B, showing that it is made up of a probability distribution which has a separate dimension corresponding to each of the parameters of the frame of FIG. 2A;

FIG. 3A provides a more detailed representation of a single dimension of the probability distribution shown in FIG. 2B, showing its mu and sigma; and FIG. 3B represents the corresponding dimension from a frame of the type shown in FIG. 2A;

FIG. 7 is a schematic representation of the clustering process by which parallel node models, that is, node models constructed by concatenating corresponding nodes from utterances of the same word by different people, are clustered to divide parallel node models from all vocabulary words into groups which are acoustically similar;

DETAILED DESCRIPTION OF A PREFERRED EMBODIMENT OF THE INVENTION

Figure 4:
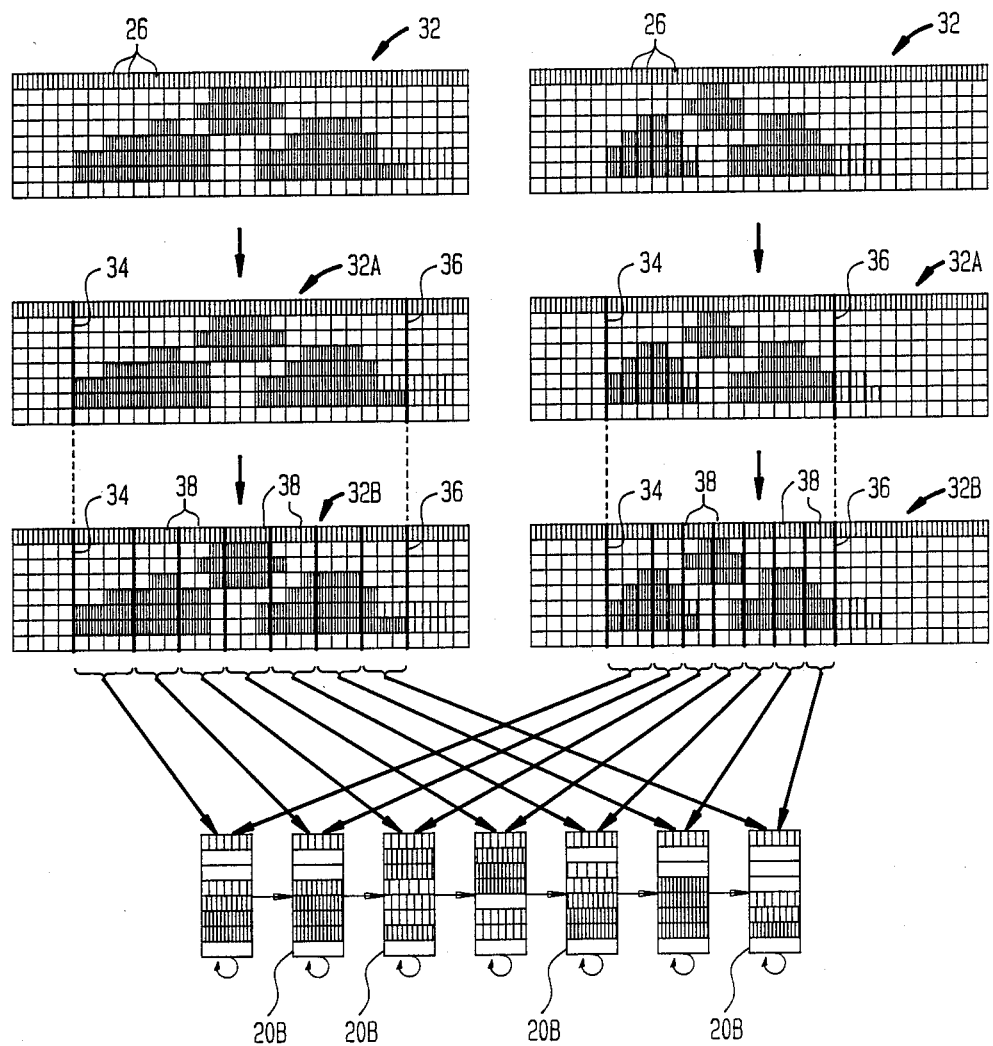
FIG. 4 is a schematic representation of the method by which the frames from a plurality of utterances of a given word are segmented by linear segmentation into a plurality of initial nodes, and how acoustic models of the type shown in FIG. 2A are calculated for each such initial node.

Referring now to the FIGS. 1A and 1B, the present invention provides a method of deriving acoustic models, such as the models 20 shown in FIG. 1B, which are to be compared against portions of speech to be recognized, such as those represented by the acoustic frames 26 shown in FIG. 1A. Such comparisons determine the likelihood that individual portions of speech correspond to the class of speech sounds represented by each such model. In the embodiment of the invention shown in these figures, the sequence 24 of frames represents the utterance of an individual word to be recognized, and the sequence 22 of acoustic models represents a vocabulary word. In a process known as dynamic programming the individual frames of the sequence 24 are compared against the individual models of the sequence 22 to determine the likelihood that the entire utterance corresponds to the entire vocabulary word. This is done for a plurality of vocabulary words, and the vocabulary word having the best score in chosen as the one most likely to correspond to the utterance to be recognized. A detailed description of such a dynamic programming method is contained in application Ser. No. 797,249.

In a preferred embodiment, each frame 26 is comprised of eight individual parameter values, as indicated in FIG. 2A. The parameter values for each frame are formed by using a fast Fourier transform to convert the digitized audio signal of the utterance into a frequency domain representation, which indicates the audio signal's energy at each of eight frequency bands during the 20 milliseconds associated with each frame. A parameter P(amp) is derived which indicates the total energy contained in all eight frequency bands. Then seven other parameters P(1)–P(7) are derived which indicate the energy in each of the seven lowest of the eight bands relative to the value P(amp).

As is shown in FIG. 2B, each acoustic model 20 is an eight dimensional probability distribution, having a separate dimension corresponding with each of the parameters of the frames 26 shown in FIG. 2A. As is illustrated in FIG. 3A, each dimension of this probability distribution has an estimated mu. This estimated mu is a statistic, or measurement, of central tendency. It indicates the estimated expected value, which, in the type of probability distribution assumed in the preferred embodiment, is the most likely value, for the corresponding parameter in a frame 26 when that frame corresponds to the class of sounds represented by the acoustic model 20. In the preferred embodiment the expected mu is calculated as an average of the corresponding parameter values in the samples of frames used to derive the model 20.

Each dimension of the probability distribution also contains a sigma, which is a statistic, or measurement, of spread. Sigma indicates the probability that the corresponding parameter value of a given frame will vary from the model's mu for that parameter if the frame corresponds to the class of sounds represented by the model 20. In the preferred embodiment, the sigma is the absolute deviation of the corresponding parameter values in the sample of frames used to derive the model 20. The absolute deviation is the average difference between the corresponding parameter values of the sampled frames and the acoustic model's corresponding mu.

In the preferred embodiment it is assumed, in order to simplify computation, that the probability distributions of the acoustic models 20 are all Laplacian distributions, which have the approximate shape shown in FIG. 3A. This assumption enables the probability distribution for each such dimension to be determined completely by the two statistics mu and sigma. Experimentation has indicated that this assumption provides a good approximation of the probability distributions of node parameter values.

As is indicated by FIGS. 3A and 3B, the probability that a frame will have a given value for a given parameter if it is an example of the class of speech sounds represented by the model 20, is indicated by the height of the probability curve shown in FIG. 3A for the value "X" of that parameter shown in FIG. 3B. The probability that a frame 26 corresponds to a given acoustic model 20 is determined by combining the individual probabilities of each parameter of that frame corresponding to each dimension of the acoustic model's probability distribution. For a more detailed description (1) of the frame shown in FIG. 2A, (2) the probability distribution shown in FIG. 2B, (3) the calculation of the likelihood that a given frame corresponds to a given acoustic model, and (4) the calculation of the likelihood that the frames of a given utterance corresponds to the sequence models of a given vocabulary word, please refer to application Ser. No. 797,249.

For purposes of the present invention, the important thing to understand from FIGS. 3A and 3B is that if either the mu's or sigma's of a model 20 are inaccurate, the probability values which results when frames are compared against that model will also be inaccurate. This inaccuracy will make the likelihood scores calculated for each word inaccurate, and thus will decrease the accuracy of speech recognition. Thus, it is desirable to make the statistics mu and sigma as accurate as possible, given the amount of sampling data from which such statistics are derived.

Figure 5:
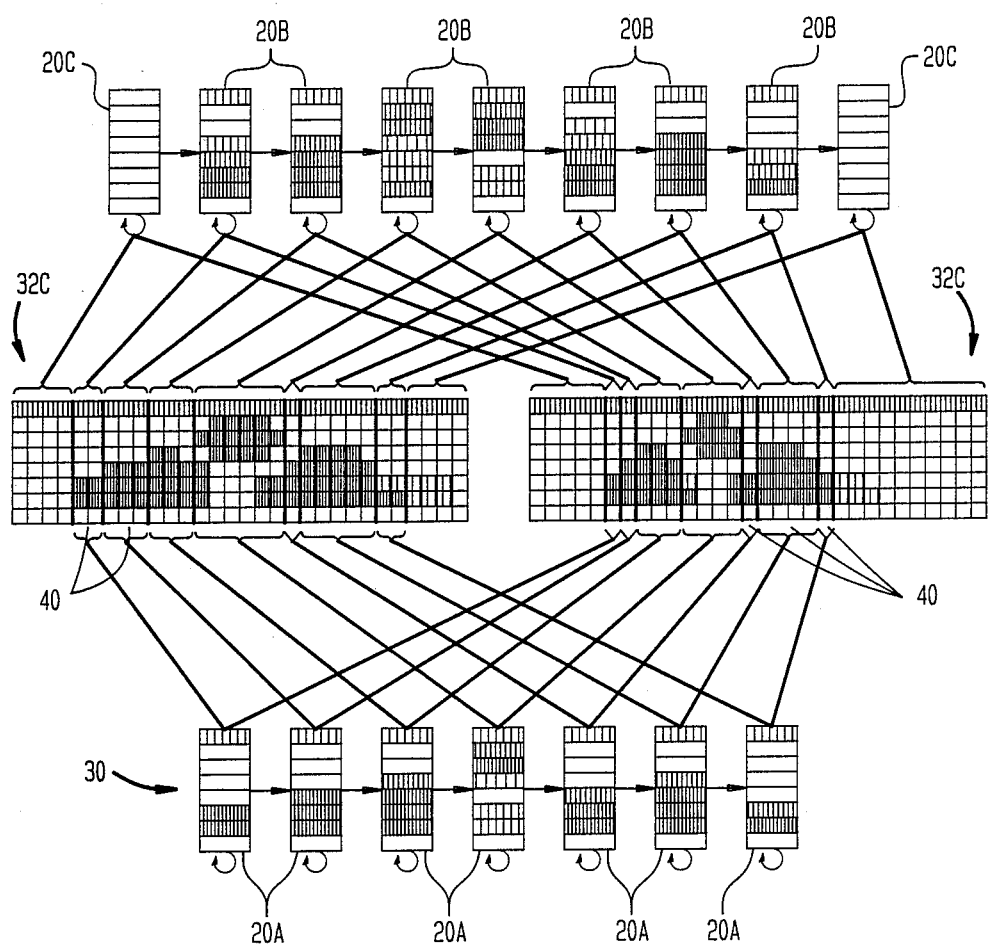
FIG. 5 is a schematic representation of the method by which the sequence of node models derived for a word, either by the method of FIG. 4 or by the method of FIG. 5, itself, are time aligned against the utterances of that word to better segment those utterances into a sequence of new nodes, and how new node models are calculated for those new nodes.

Referring now to FIGS. 4 and 5, a method is described of how acoustic models, such as the acoustic models 20A, are derived. This method derives, for a given word, a word model 30 which is comprised of a sequence of acoustic models 20A. Each model 20A represents a node, that is, an acoustically uniform portion of the given word.

Referring now to FIG. 4, when the present invention is used to improve the accuracy of node models spoken by one person, the multiple utterances 32 shown at the top of FIG. 4 are all spoken by that person. Once this is done, the beginning of speech 34 and the end of speech 36 of the frame sequence associated with each utterance 32 are marked approximately by any one of several known speech detecting techniques, as is shown in the frame sequences labeled 32A. Then the part of each utterance between the detected beginning 34 and end 36 of speech is divided in an approximately linear manner into an equal number of segments 38, with each of the segments in each utterance containing approximately the same number of frames, as is indicated in the frame sequence labeled 32B. Then initial acoustic node models 20B are calculated for each of the corresponding segments 38 which occur in different utterances of the word. That is, all the frames in the first segment of frames from each utterance are combined by calculating the expected mu, or means, and the expected sigma, or absolute deviation, of each of the eight parameters P(1)–P(amp) over all of those frames, to calculate a first initial node model 20B. This process is repeated for all of the frames in the second segment 38 of each utterance, to calculate the second initial node model 20B, and so on.

As is shown in FIG. 5, the resulting sequence of initial node models 20B is then time aligned against the frames of each utterance 32 of the given word by means of the well known technique of dynamic programming. This technique divides each utterance into a sequence of segments 40, so that the frames of each segment provide a optimal acoustic match against their corresponding node model 20B. The resulting segmented utterance is labeled 32C. As is shown in FIG. 5, a silence node model 20C, derived from frames recorded when there is no speech, is added to the beginning and end of the sequence of initial nodes 20B. This causes the time alignment process to align frames recorded before and after the occurrence of actual speech with such silence node models. It is done because the dynamic programming used in FIG. 5 is much more accurate at detecting the beginning and end of speech than the generally more superficial techniques used to find the beginning and end of speech markers 34 and 36, described above with regard to FIG. 4.

Once each of the utterances 32C has been divided into segments 40, a new sequence of node models 20A is calculated in a manner similar to that in which the node models 20B were calculated, that is, by combining together all the frames from the segment of each utterance 32C time aligned against the same node model 20B, and calculating a new node model 20A from those frames by determining the mu and sigma for their eight parameters. As is well known in the technique of dynamic programming, the process shown in FIG. 5 is preferably repeated a number of times. That is, the sequence of node models 20A produced by one iteration of this process are then used in place of the sequence of node models 20B shown in FIG. 5 in the next iteration of the process, in order to more accurately segment the utterances 32C, and thus to develop more accurate node models. These iterations are repeated until the changes in node models caused by each iteration become insignificant.

Figure 6:
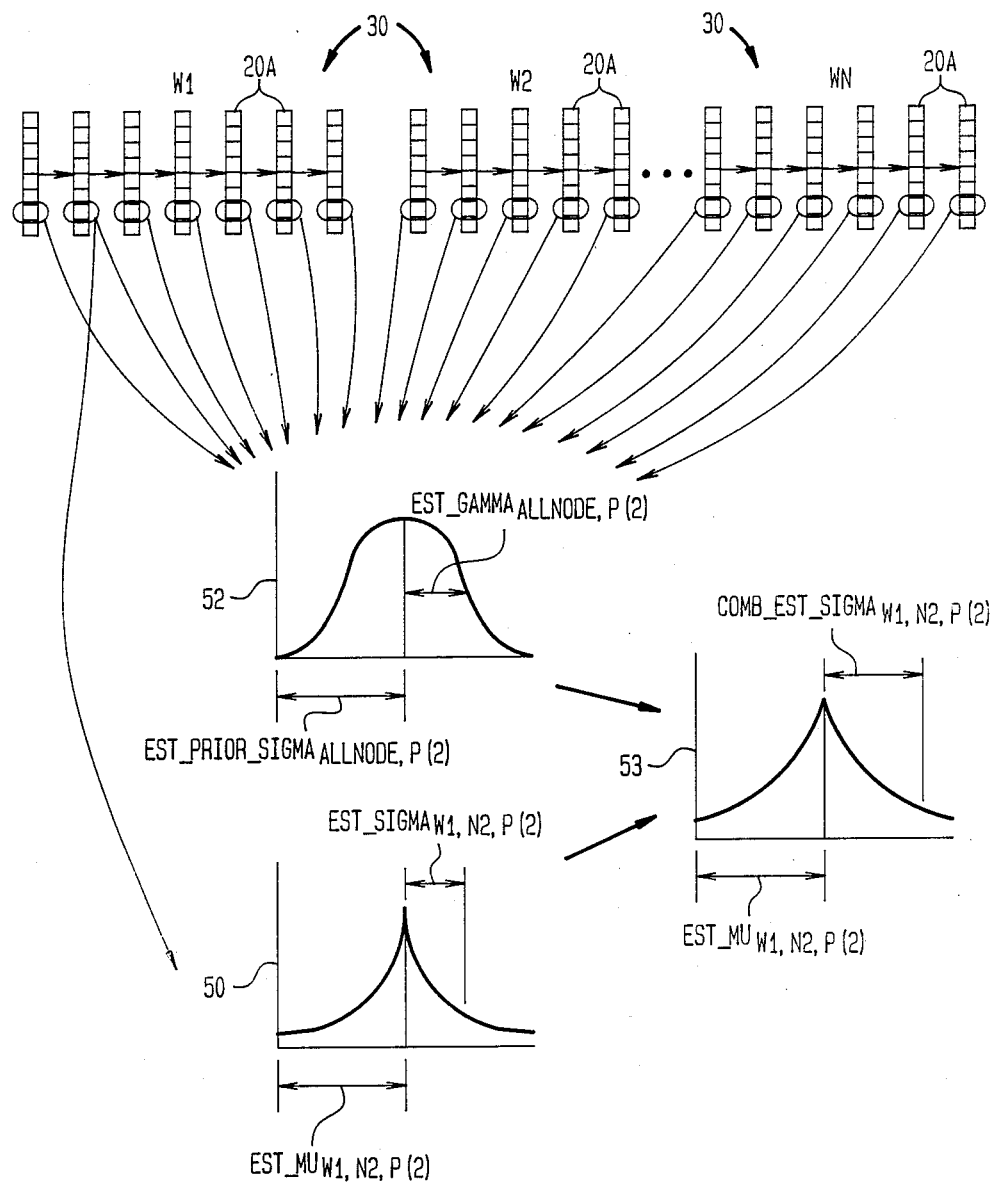
FIG. 6 is a schematic representation of the method by which the sigma for a given dimension of a node model is combined with a prior sigma calculated from the sigma's of the same dimension of a plurality of node models, to produce a combined statistic for use in the model for that particular node.

Referring now to FIG. 6, a method according to one embodiment of the present invention is shown. This method generally increases the accuracy of the sigma's of node models 20A of the type derived by the method of FIGS. 4 and 5. It does this without requiring any more data than is normally used to derive acoustic models 20A for a large group of words.

FIG. 6 shows the word models 30 for a plurality of separate words W1, W2, . . . WN. These word models have been derived by the method of FIGS. 4 and 5, and each contains a sequence of node models 20A. The accuracy of each node model 20A is improved by taking each of its dimensions 50, and combining its sigma with an estimated prior sigma calculated from the distribution of individual estimated sigma's calculated for each of the nodes 20A taken from the words W1 through WN.

In the particular example illustrated in FIG. 6 the sigma to be improved is that of the P(2) dimension of the second node of the word W1. That dimension is of the same basic type shown in FIG. 3A, except that its mu is labeled $EST\_MU_{W1,N2,P(2)}$ to indicate that it is the estimated mu of the parameter P(2) of the second node of the word W1. It is an estimated mu because the actual value of a mu can only be determined after all possible frames associated with the sound associated with the mu have been sampled, which, of course, is impossible. Similarly the sigma of this distribution is labeled $EST\_SIGMA_{W1,N2,P(2)}$ to indicate that it is the estimated sigma for the same parameter of the same node model.

In the embodiment of the invention illustrated in FIG. 6, the probability distribution 52 is a distribution of all of the estimated sigma's calculated for each node model 20A of each word. For purposes of simplification it is assumed that this distribution of sigma's has a normal distribution. This assumption is sufficiently accurate to produce good results. The estimated prior sigma is labeled $EST\_PRIOR\_SIGMA_{allnode,P(2)}$ to indicate that it is the estimated prior sigma for the parameter P(2) derived from all the nodes of all words. The word "prior" is used to indicate that it is part of a prior probability distribution representing the broader class of speech sounds of which the speech sounds associated with a given node are a sub-class. Thus it provides some information about the probability distribution of a given node even before samples of that particular node are used to calculate the given node's for that distribution. This combined estimated sigma is then used, in conjunction with the original estimated mu, $\text{EST\_MU}_{W1,N2,P(2)}$, to represent the P(2) dimension in the acoustic model 20A.

In general the method of FIG. 6 calculates combined estimated sigma's, such as $\text{COMB\_EST\_SIGMA}_{W1,N2,P(2)}$, according to the following formula:

$$\text{comb\_est\_sigma}_i = \frac{\text{est\_sigma}_i/\text{est\_variance}_i + \text{est\_prior\_sigma}/(\text{est\_gamma})^2}{1/\text{est}_{13}\text{variance}_i + 1/(\text{estimated\_gamma})^2}$$

in which:
  $\text{comb\_est\_sigma}_i$ is the combined estimated sigma for a given dimension of a given ith class of speech sounds represented by a given node model;
  $\text{est\_sigma}_i$ is the estimate sigma derived for the given dimension of the given node from frames sampled from the sounds associated with that node;
  $\text{est\_variance}_i$ is the estimated variance of $\text{est\_sigma}_i$;
  $\text{est\_prior\_sigma}$ is the estimated prior sigma for the corresponding dimension of the class of speech sounds represented by all nodes of all words;
  $\text{est\_gamma}$ is the estimated variance of the spreads of the given ith class of speech sounds.

The estimated variance is calculated according to the formula:

$$\text{est\_variance}_i = K[\text{comb\_est\_sigma}_i]^2/n_i$$

in which
  K is a constant derived by trial and error, which depends on the actual shape of the probability distributions of the node models and which normally varies between 0.5 and 1.5; and
  $n_i$ is the number of samples, or frames, from the ith class of speech sounds used to calculate $\text{est\_sigma}_i$.

The estimated prior sigma is calculated according to the formula:

$$\text{est\_prior\_sigma} = [1/N](\text{sum}_i(n_i*\text{est\_sigma}_i))$$

in which
  $\text{sum}_i$ means the sum of the expression in the following parenthesis taken over all values of i, that is, the sum of that expression added separately for each of the ith classes of speech sounds represented by each of the nodes of each of the words W1 through WN;
  $n_i$ is the number of samples, or frames, from the given ith sub-class of sounds used to calculate $\text{est\_sigma}_i$; and
  N is the $\text{sum}_i(n_i)$.

The variance of the distribution 52 of sigma's is labeled $\text{EST\_GAMMA}_{ALL\ NODE,\ P(2)}$ in FIG. 6. This is an estimate of the gamma, or variance, of the actual sigma's of all of the nodes of all of the words. The estimated gamma is calculated according to the formula:

est_gamma = the square root of the following expression:

$$\frac{\text{sum}_i[n_i*(\text{est\_sigma}_i - \text{est\_prior\_sigma})^2] - m*K*(\text{est\_prior\_sigma}^2)}{N + mK}$$

in which:
  $\text{sum}_i$ means the sum of the expression in the following parentheses over all values of i, that is, the sum of that expression added separately for each of the ith classes of speech sounds represented by each of the nodes of each of the words W1 through WN;
  $n_i$ is the number of samples, or frames, from the ith sub-class of speech sounds which are used to calculate $\text{comb\_est\_sigma}_i$;
  m is the number of sub-classes, or nodes, in the second class of speech sounds, represented by all nodes of all words W1 though WN, for which $\text{est\_prior\_sigma}$ is calculated;
  K is a constant; and
  N is the $\text{sum}_i(n_i)$.

The formula for the combined estimated sigma is a weighted average. In this weighted average the contribution of $\text{est\_sigma}_i$, the estimated sigma calculated solely from the frames associated with the given node, varies inversely with the estimated variance for that node. This makes sense, because the estimated variance, in effect, represents the unreliability of the estimated sigma, and thus it is proper that the contribution of the estimated sigma decrease as the unreliability increases. As can be seen from the formula for estimated variance, above, this measure of unreliability tends to go up as the number of samples $n_i$ goes down, where $n_i$ is the number of frames from which the estimated sigma is calculated.

The formula for the estimated variance also makes the assumption that the estimated variance for the estimated sigma of a given dimension of a given node is a function of the actual sigma of that dimension. But since that actual sigma is unknown, its best estimate is the combined estimated sigma. Since the above formula for the combined estimated sigma is calculated as a function of the estimated variance, and since the estimated variance is calculated as a function of the combined estimated sigma, it is difficult to solve for the estimated variance directly. But, as those skilled in the mathematical arts will understand, the values of the combined estimated sigma and the estimated variance can be calculated by means of cubic equations, or by iterative techniques.

In the weighted average used to calculate the combined sigma, the contribution of $\text{est\_prior\_sigma}$, the estimated prior sigma calculated from all frames of all nodes for a given dimension, is weighted inversely with $\text{est\_gamma}^2$, the estimated variance of the sigma's of all node models for that dimension. This makes sense, because the more the sigma's for a given dimension vary from node to node, the less likely the actual sigma for the current node and dimension is to correspond to the estimated prior sigma.

In the method illustrated in FIG. 6, the sigma's of a individual node model are combined with sigma's calculated from all node models, but the mu's are not similarly combined. This is done because the sigma's, for a given parameter, are relatively similar across all node models. Thus, where the estimated sigma for a given dimension of a given node model is based on relatively little information, changes are good that the accuracy of that sigma can be improved by averaging its value with the estimated prior sigma. But such an averaging is generally not useful in this case for mu's, because the estimated mu's for a given dimension differ greatly across different nodes. Thus chances are relatively good that such an averaging of mu's might actually decrease their accuracy, rather than increase it.

In one preferred embodiment of the present invention, steps similar to those described above with regard to FIGS. 4, 5, and 6 are used in conjunction with a method for deriving acoustic cluster models which is like the method described in application Ser. No. 862,275. According to this method, the steps of FIGS. 4 and 5 are performed for each word in the vocabulary by having a large group of speakers speak one or more utterances of each word in the vocabulary. It is recommended that at least ten, and preferably a much larger number of speakers be used. The method of FIG. 4 divides the utterances of each vocabulary word into corresponding segments 38, from which a sequence of initial node models 20B is calculated. Then a sequence of multi-speaker node models 20A is derived for each word by the method of FIG. 5.

Once a sequence of multi-speaker node model 20A have been derived for a given vocabulary word, that sequence is time aligned against all utterances of the word by a given one of the speakers used to derive the multiple speaker models. This is repeated for each of the multiple speakers, to produce a model of how each of such speakers says the word. Since each speaker's model for the word is derived from a time alignment against a common set of multi-speaker node models, each such word model contains a corresponding set of nodes.

Figure 7:
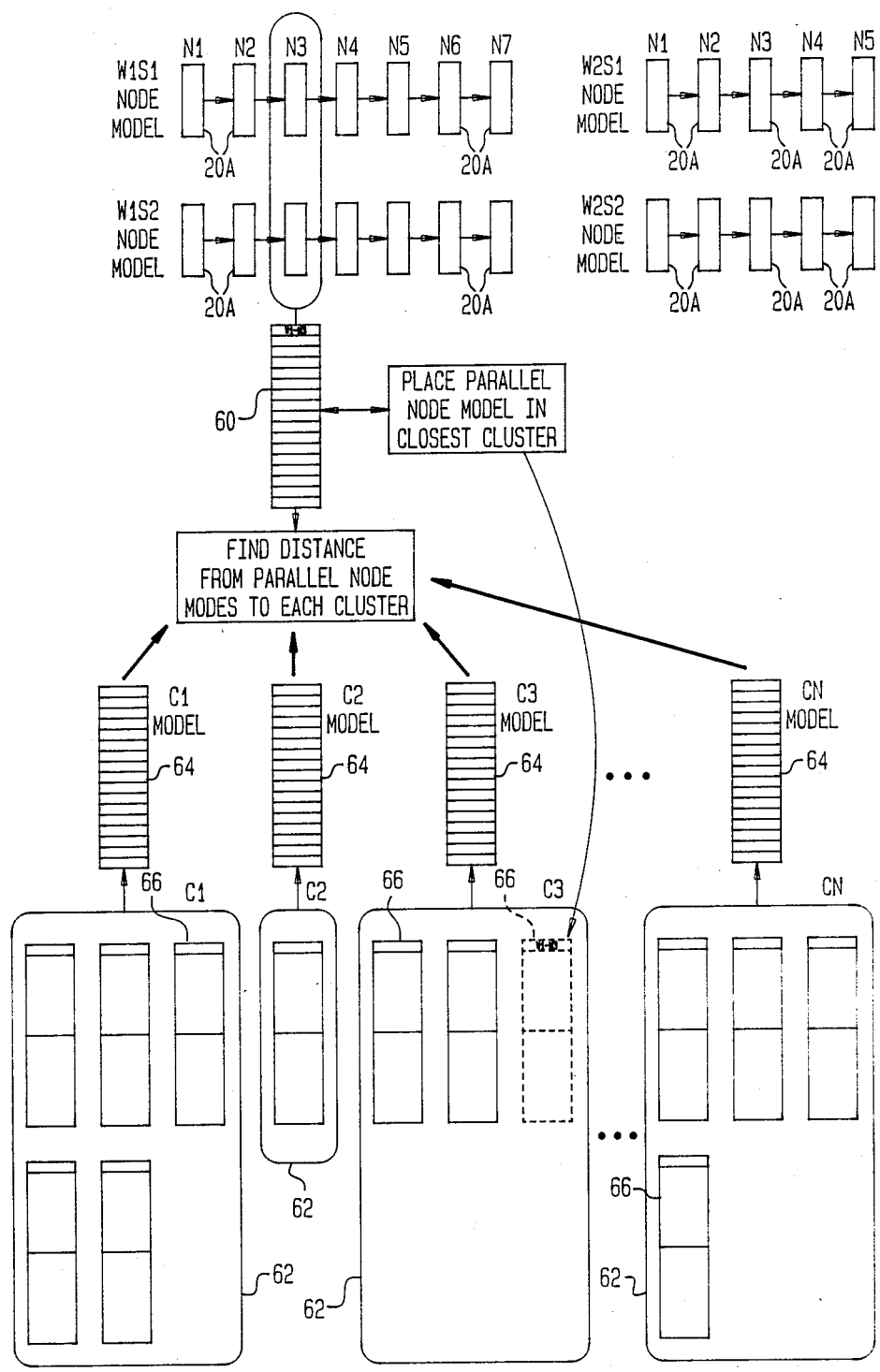

Once this is done, the clustering process shown in FIG. 7 can take place. As is described in greater detail in application Ser. No. 862,275, the method of FIG. 7 concatenates each of the corresponding node models 20A produced by different speakers for a given word into a parallel node model 60. In FIG. 7, word models from each of two speakers are shown for each of two words, but in an actual preferred embodiment of the invention there are normally many more than two speakers, and many more than two words. As a result, the parallel node models formed by concatenating the eight dimensions of corresponding nodes from different speaker's word model will normally have many more than the 16 dimensions indicated in FIG. 7. According to the clustering method represented in FIG. 7 and described in greater detail in application Ser. No. 862,275, the parallel nodes are divided into groups, or clusters, of relatively similar nodes and a cluster model is calculated for each such cluster. Each such cluster model is a probability distribution having the same number of dimensions and the same basic form as the parallel nodes clustered within it. The mu's and sigma's for each dimension of the cluster model are calculated from the corresponding dimensions of the parallel node models placed within it.

The change which this embodiment of the present invention makes to the clustering process described in application Ser. No. 862,275, is it use of the process described above with regard to FIG. 6 to average the estimated sigma for each dimension of each node of each individual speaker with an estimated prior sigma calculated for that dimension from all node models calculated by that speaker. Experience has shown that the combined estimated sigma which this method produces for each dimension of each node model generally improves the performance of the clustering process described with regard to FIG. 7. It does this because it generally improves the accuracy of the estimated sigma's of the parallel node models which are clustered. In particular, it has been found that averaging the sigma's for each node toward the corresponding estimated prior sigma for all nodes tends to make the parallel node models 60 more similar. It does this by partially canceling the variation between such nodes which are generated by sampling error. As a result the number of clusters produced by such a clustering process with a given clustering threshold is reduced.

According to one embodiment of the present invention, the combining of statistics is applied to another aspect of the method disclosed in application Ser. No. 862,275. In particular, the invention is used to generally improve the statistical accuracy of acoustic models which represent how an individual end user speaks the individual speech sounds in which the models of the system's vocabulary words are spelled.

Figure 8:
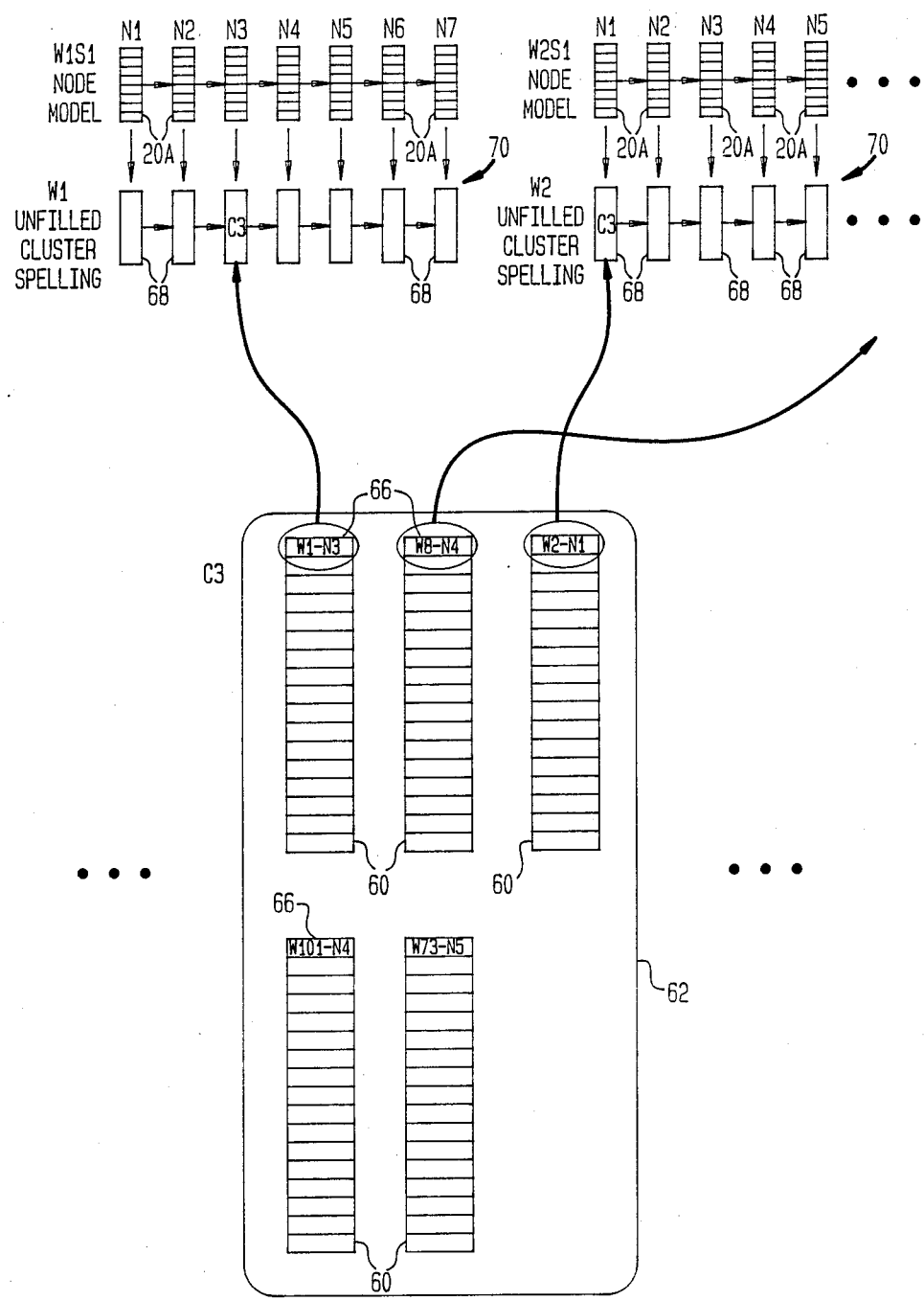
FIG. 8 is a schematic representation of the method by which cluster spellings are derived for individual vocabulary words by associating with each such word the sequence of clusters derived by the method of FIG. 7 which are associated with its sequence of nodes.

Application Ser. No. 862,275 explains that once the parallel nodes shown in FIG. 7 have been clustered, cluster spellings are derived for each vocabulary word by the method illustrated in FIG. 8. In the method of FIG. 7 when a given parallel node model 60 is placed in a cluster 62, the mu's and sigma's of its multi-dimensional probability distribution are statistically combined into the corresponding mu's and sigma's of that cluster's cluster model 64. In addition, a node ID 66, which identifies the word and the number of the node within that word from which the parallel node model was derived, is associated with the cluster. After all the parallel nodes 60 have been grouped into clusters 62, the method of FIG. 8 creates cluster spellings 70, by going through the list of node ID's 66 associated with each cluster 62. For each node ID associated with each such cluster, the method finds the node of the word identified by that ID and associates with that node a cluster ID 68 which identifies the Cluster into which the parallel node model associated with that node was grouped. After this process is repeated for each cluster, each word has associated with it a sequence of cluster ID's 68, which constitutes a cluster spelling for that word.

Figure 9:
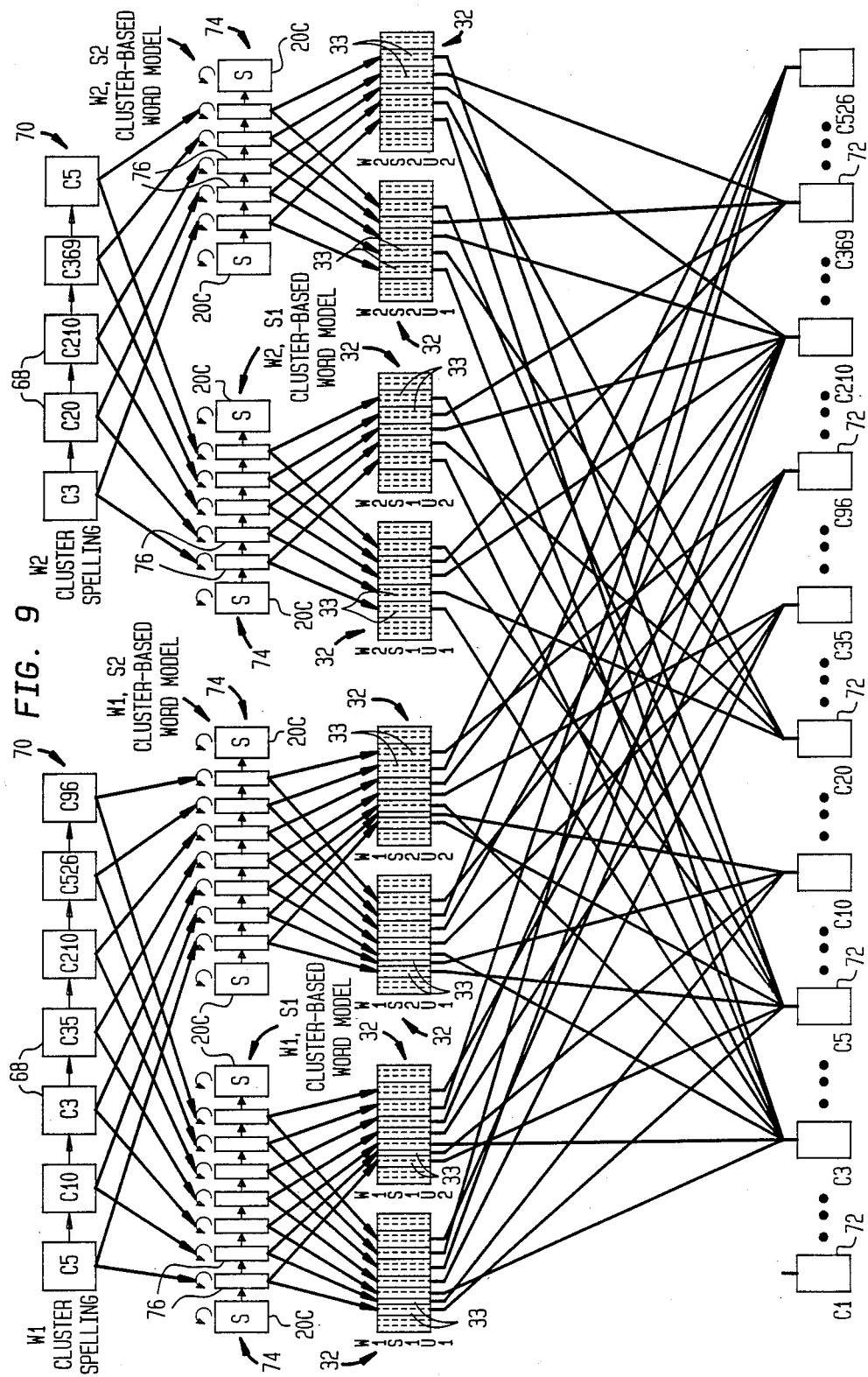
FIG. 9 is a schematic representation of the method by which multi-speaker acoustic models are derived for each of the clusters derived by the method shown in FIG. 7.

Then as is illustrated in FIG. 9, and as is described in greater detail in application Ser. No. 862,275, these cluster spellings 70 are used to calculate 8-dimensional multiple-speaker acoustic models 72 for each of the clusters 62. This is done by developing a speaker-dependent cluster-based word model 74 for each word in the vocabulary, as spoken by one of the speakers used to develop the multi-speaker cluster models. These word models are developed for a given word and a given speaker by associating with each cluster ID 68 in the cluster spelling 70 of that word the eight dimensions of the cluster model 64 identified by that cluster ID which are associated with the given speaker. At the beginning and end of this model, an 8-dimensional acoustic model of silence 20C is added, to optimize the time alignment of the portion of the cluster-based word model which represents speech against those frames of the corresponding utterances 32 which also represent speech.

Once word models 74 have been derived for each word and each speaker, they are time aligned against each utterance of that word by the given speaker. The time alignment is performed by a dynamic programming method similar to that described with regard to FIG. 5. Once this has been done for all speakers and for all words, all of the frames from all words and all speakers which correspond with a given cluster ID are combined and used to calculate an 8-dimensional multi-speaker acoustic model for that cluster.

As is described in application Ser. No. 862,275, deriving cluster spellings for all the vocabulary words of a speech recognition system greatly reduces the amount of training words that an end user is required to speak in order to train the system to recognize the system's vocabulary word, as spoken by him. Without such a cluster spelling, a speaker dependent system normally requires each end user to speak each word the system is to recognize. This is normally required to enable such a system to develop a node-based word model for how the end user speaks each such word. In a general purpose dictation system, which should have at least five thousand to twenty thousand words in its vocabulary, the requirement that each end user speak each vocabulary word enough times to train up node model for it is a very great burden. Such training could take as long as one whole work week to complete.

Figure 10:
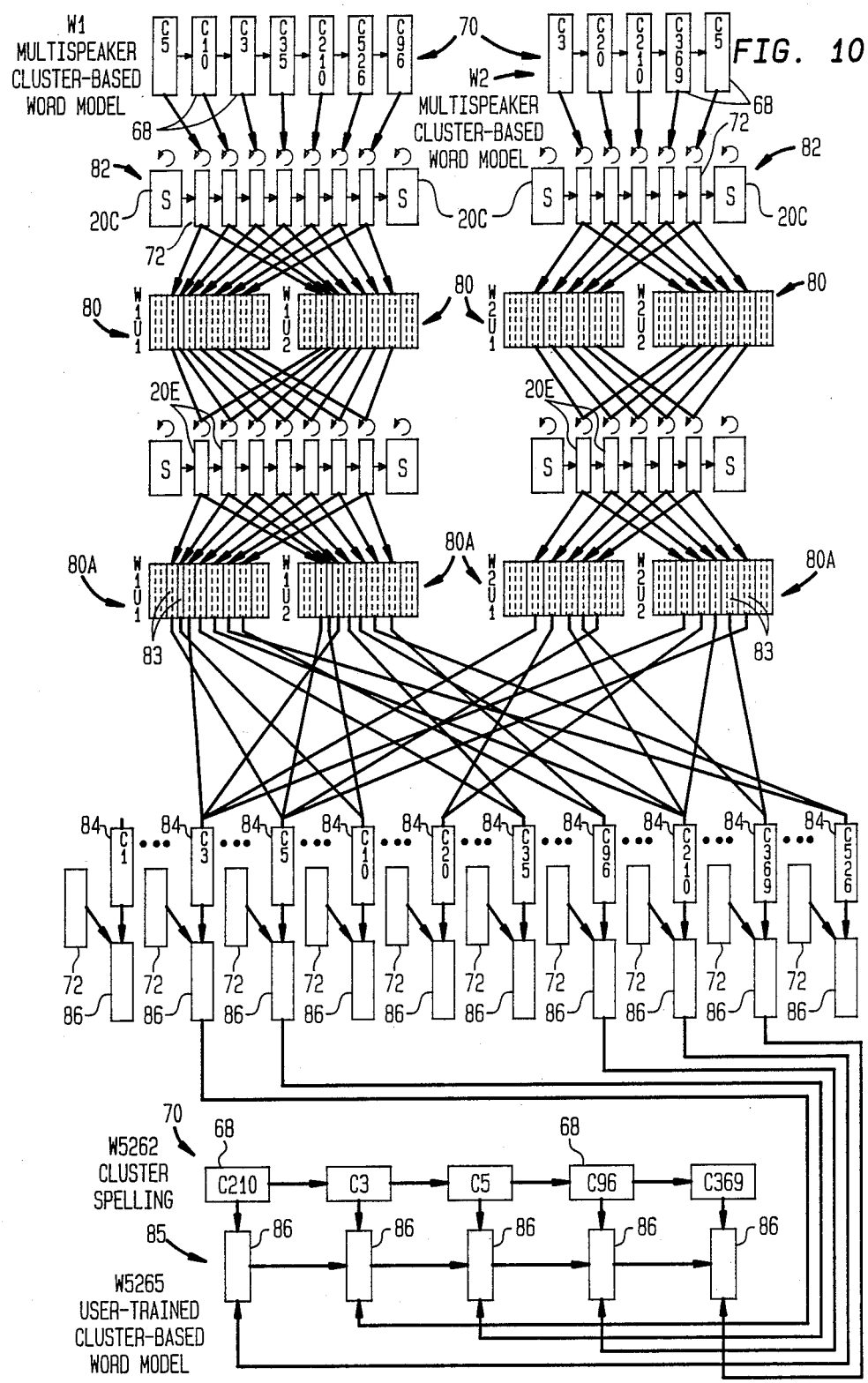
FIG. 10 is a schematic representation of the method by which an end user can train acoustic models for each cluster derived in the method of FIG. 7, by which the statistics for those cluster models are combined with statistics from the corresponding cluster models calculated according to the method of FIG. 9, and by which cluster models containing such combined statistics can be used to represent vocabulary words, including words not specifically spoken during this training step.

But, by using cluster spellings and cluster models of the type described above, an end user can train up a large vocabulary system by speaking a relatively small percent of its vocabulary words. This method of training acoustic models for a large number of vocabulary from utterance of relatively few words is represented in FIG. 10, and is described in greater detail in application Ser. No. 862,275.

According to this method, the end user speaks multiple utterances of enough training words to enable the system to train up a speaker-dependent acoustic model for each of its clusters. The system provides a word model 82 for each of training words spoken by the end-user. A model 82 is derived for each training word by associating with that word the sequence of multi-speaker clusters 72, derived by the method of FIG. 9, corresponding to the cluster ID's of the word's cluster spelling 70. The multi-speaker cluster-based word model for each of the training words is then time aligned by dynamic programming against each utterance 80 of that word by the end-user. The frames in each utterance 80 of a training word time aligned against a given multi-speaker cluster model are then combined to develop an initial model 20E of how that individual end user speaks that individual cluster in that individual word. In the preferred embodiment of this aspect of the invention, this dynamic programming process is repeated until each of the utterances has been broken into a optimal sequence of segments 83, as is shown at 80A.

Once this has been done, all the frames, from all training utterances of all words spoken by the end user, which have been time aligned with a given cluster 68 are combined to form an end-user acoustic cluster model 84. Each of these end-user cluster models has an 8-dimensional probability distribution of the type shown in FIG. 2A.

As is described in application Ser. No. 862,275, once acoustic models, such as the models 84, have been developed for how the end-user speaks each of the clusters, these models can be plugged directly into the cluster spelling 70 of each of a speech recognition system's vocabulary word to produce a end-user cluster-based word model, similar to the word model 85, for that vocabulary word. This can be done even though the user has not specifically trained a model for the vocabulary word by speaking it. Such a process is represented at the bottom of FIG. 10 in which the cluster spelling of a vocabulary word W5265 is used to generate an end-user cluster-based model for that word.

According to the embodiment of the present invention represented in FIG. 10, however, the statistics of the end-user cluster models 84 are combined with the statistics from the multi-speaker cluster models 72, to form a combined end-user cluster model 86.

The mu's and sigma's of each such combined end-user cluster model are generally more accurate at representing the way in which the end user speaks the given cluster over all vocabulary words than the original end-user cluster models 84, which are derived from the speaking of each cluster in only a few words. In this embodiment, it is these combined end-user cluster models 86 which are plugged into the cluster spellings 70 of vocabulary word to form the end-user cluster-based word models 85.

Figure 11:
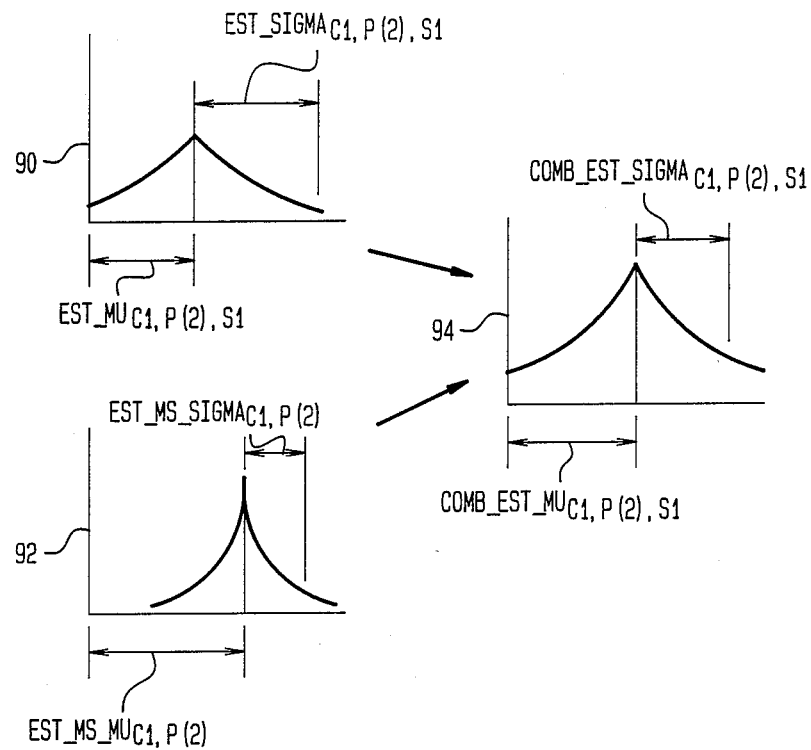
FIG. 11 is a schematic representation of the method by which both the mu and sigma from one dimension of a given cluster model derived from words spoken by an end user is combined with the corresponding statistics from a cluster model derived by the method of FIG. 9 from multiple speakers, to calculate combined mu's and sigma's for use in the model of how the end user speaks the given cluster.

FIG. 11 illustrates schematically how the mu and sigma of each dimension 90 of the original end-user acoustic cluster model 84 are combined with the mu and sigma of the corresponding dimension 92 of the multi-speaker cluster models 72 to produce the corresponding dimension 94 of the combined end-user cluster model 86. Here both mu's and sigma's are averaged because the mu's of a given cluster, as spoken by different people, do not vary nearly as much as do the mu's spoken by one person over different nodes or different clusters. Since the original end-user cluster models 84 are derived from a relatively small number of utterances of a relatively small number of words, their mu's and sigma often contain a large amount of sampling error. The mu's and sigma's from the multi-speaker cluster model 72 do tend to differ from the proper mu's and sigma's for a model of how the end user speaks a given cluster. But the mu's and sigma's of the multi-speaker cluster models tend to contain much less sampling error that those of the original end-user cluster models, since they are derived from more utterances of each cluster, and since they are derived from utterances of each cluster in all the vocabulary words in which they occur.

The particular formula used for calculating the combined mu, comb_est_mu, and the combined sigma, comb_est_sigma, for each dimension of each end-user cluster model in the method of FIG. 11 is as follows:

$$\text{comb\_est\_mu} = \frac{R_{mu}*\text{est\_ms\_mu} + n*\text{est\_mu}}{R_{mu} + n}$$

and $$\text{comb\_est\_sigma} = \frac{R_{sigma}*\text{est\_ms\_sigma} + n*\text{est\_sigma}}{R_{mu} + n}$$

where
$R_{mu}$ is a constant derived by trial and error indicating the relevance of the multi-speaker mu to the calculation of the combined estimated mu;
est_ms_mu is the estimated mu of the corresponding dimension of the multi-speaker cluster model 72;
n is the number of frames from which the original end-user cluster model 84 is derived;
est_mu is the estimated mu of the given dimension of the original end user cluster model 84

$R_{sigma}$ is an empirically derived constant which indicates the relevancy of the multi-speaker sigma to the calculation of the combined estimated sigma;

est_ms_sigma is the estimated sigma of the corresponding dimension of the multi-speaker cluster model 72; and the end user cluster model 84; and est_sigma is the estimated sigma of the given dimension of the end user cluster model 84.

These formula for the calculation of the combined estimated sigma and the combined estimated mu are basically similar in form. They both calculate the combined estimated statistic as a weighted average of the corresponding statistics from the original end-user cluster model 84 and the multi-speaker cluster model 72. They both increase the contribution to that weighted average of the statistic from the original end-user cluster model 84 in direct proportion to the number of frames from which that cluster model is calculated. This is done because the larger the number of frames from which the end-user cluster model is derived, the more likely it is to be accurate.

Both these formulas also weight the contribution of the corresponding statistic from the multi-speaker cluster model 72 in proportion to a constant R, either $R_{mu}$ or $R_{sigma}$. In the preferred embodiment, trial and error techniques are used to determine the value of R which produces combined statistics that perform best when used for speech recognition. Experience has indicated that the optimal value of R varies as function of a number of factors, such as (1) the relative number of frames from which the multi-user cluster models 72 are derived compared to the number n from which the corresponding end-user cluster model is derived, (2) the number of vocabulary words which the end-user actually speaks to train up a given cluster model, compared to the total number of vocabulary words in which that cluster appears, and (3) the number of speakers which are used to derive the multi-speaker cluster models 72.

It has been found that the value of R used in both these formulas is substantially less than the number of frames from which the multi-speaker cluster model 72 is derived. This indicates that individual samples, or frames, of how multiple speakers say a given cluster are not as relevant to determining how a given end-user says that cluster as a given sample spoken by the end-user himself. But, as we said above, the mu's and sigma's of the multi-speaker model 72 are relevant because they are derived from a very much larger amount of data, and thus have less sampling error, and also because they are derived from a much larger number of words, and thus contain information about how the given cluster is spoken in the context of words for which there is not training data from the end-user.

In other embodiments of the present invention, the invention is used to average statistics representing the expected duration of the individual nodes, or speech sounds, associated with individual parts of a specific vocabulary word. According to one such embodiment, this is done to derive an improved estimated mu, or average, of the duration for each node, as spoken by a given end user. In such an embodiment, when the process of FIG. 9 is carried out, a calculation is made of the average duration of each node of each word. More specifically, a count is made of the total number of frames which are time aligned against the model 76 of the node's corresponding cluster 68 in each utterance of the node spoken by each of the multiple speaker used in the process of FIG. 9. This total is divided by the total number of utterances of the node, to derive its average number of frames. This average value is the estimated prior duration mu, which in the preferred embodiment is the average value for the duration of the node when spoken by the multiple speakers.

Then, according to this embodiment, when the process of FIG. 10 is performed, an additional step is made to record the average number of frames time aligned against the models 20E associated with the node in each of its training utterances. The resulting average produced for the duration of each node is the end-user duration mu for that node. This end-user duration mu is then combined with the estimated prior duration mu for the same node derived from the multiple speakers multiple speaker. This combined is done by the same mathematical formula described above for combining the mu's of the end-user cluster models 84 and those of the multi-speaker cluster models 72. The only difference is that the empirical constant $R_{mu}$ used for combining the duration mu's is different than the $R_{mu}$ used in the combining of mu's of the cluster models 84 and 72.

This method of combination of duration mu's is applicable to those nodes of which the end user speaks training instances during the process of FIG. 10. It generally improves the estimate of how long the end user spends speaking each such node. This is because the end user usually only says several training utterances of any given node in the process of FIG. 10. As a result, the duration mu's derived solely from the end user's utterances usually have a large sampling error. Although the multi-speaker duration mu's are biased, to the extent that they fail to inform how the end user's durations differ from the multi-speaker average, they have little sampling error, and thus contain reliable information about the average duration of each node as spoken by many people.

It can be seen that a new improved method for deriving acoustic models for use in speech recognition systems has been described. Experiments have shown that speech recognition systems which use acoustic models derived by this method have significantly better performance than those derived by corresponding previous techniques. In particular, the present invention enables more accurate acoustic models to be derived for the representation of each of a plurality of classes of speech sounds, without requiring more sampling data from each such class. Experiments have shown that the methods of this invention improve the efficiency of systems which cluster acoustic models of speech sounds. Experiments also show that the methods of this invention improve the performance of speech recognition systems which uses acoustic models of how an end user speaks a given speech sound by combining the statistics derived from that end user with statistics derived from a larger number of speakers.

In the description above, the statistics combined by the present invention have been estimated mu's, in the form of means, and estimated sigma's, in the form of absolute deviations. It should be understood, however, that in other embodiments the invention combines other types of statistics, including other measurements of central tendency, such as medians, as well as other measures of spread, such as variances and standard deviations.

Most of the probability distributions described above are 8-dimensional spectral probability distributions. In alternate embodiments, however, the invention is used with probability distributions of different numbers of dimensions, and probability distributions representing different types of parameters, such as linear predictive coding parameters, cepstral parameters, or even parameters based on feature extraction, where a given parameter represents the probability that a given feature has been observed.

There is discussion above about combining statistics from an individual original end-user cluster model with statistics from corresponding multi-speaker cluster models. In alternative embodiments the original end-user cluster models are actually multiple end-user cluster models, derived by having a small group of end-users train each of a set of cluster models by the method described above with regard to FIG. 10. This causes each such end user cluster model to represent a given speech sound as it is spoken by that small group. In such an embodiment it is still beneficial to combine the statistics of such multiple end-user cluster models with the statistics from corresponding multiple-speaker cluster models when the multi-speaker cluster models 72 is derived from a larger group of speakers.

The specification above demonstrates the combining of statistics from one node or cluster with statistics derived from other nodes or clusters. But it should be understood that the present invention is intended to encompass, among other things, the general idea of combining of a statistic derived from a first class of a speech sound corresponding to one speech unit with a corresponding statistic derived from a second class of speech sounds corresponding to a plurality of such speech units. In this case "speech unit" is meant to refer to a similar speech sounds which occurs in a part of one of more words. In some embodiments such speech units include nodes or clusters of the type described above. In other embodiments they include allophones or phonemes.

It should also be understood that, although the text above describes the use of this method in conjunction with discrete word recognition, it is equally applicable to use in systems designed to recognize connected or continuous speech.

Accordingly, the present invention should not be considered to be limited by the description herein of the preferred embodiments, but rather should be interpreted in accordance with the following claims.

I claim:

1. A method of deriving an acoustic model of a first class of speech sounds, which acoustic model is to be compared against a portion of speech to be recognized to determine the likelihood that the portion of speech corresponds to that first class of speech sounds, said method including:
    calculating a first statistic of the first class of speech sounds from acoustic data derived from one or more samples of that class of speech sounds;
    calculating a second statistic from acoustic data derived from samples of a second class of speech sounds, at least some of which samples correspond to speech sounds which do not belong to the first class of speech sounds for which said acoustic model is being made;
    calculating a combined statistic which is a weighted combination of the first and second statistics; and
    using said combined statistic as at least a part of said acoustic model of said first class of speech sounds.

2. A method as described in claim 1, wherein said first statistic is calculated from fewer samples of speech sounds than is said second statistic.

3. A method as described in claim 1, wherein said second class of speech sounds includes the first class of speech sounds as a subset.

4. A method as described in claim 1, wherein said first class of speech sounds correspond to one speech unit, and the second class of speech sounds correspond to a plurality of such speech units, such that the average spectral difference between two samples from said first class is less than the average spectral difference between two samples from said second class.

5. A method as described in claim 4, wherein said first and second statistic are measures of spread of the samples from their respective classes.

6. A method as described in claim 5, wherein the speech samples of said first class of speech sounds are samples from the corresponding portion of one word spoken one or more times and the speech samples of said second class of speech sounds are samples from a plurality of words.

7. A method as described in claim 6 which is used to derive acoustic models for representing clusters of speech classes, wherein:
    there are a plurality of first classes of speech sounds, each corresponding to a speech unit which includes speech sounds associated with a given part of one of a plurality of different words;
    a first statistic is calculated for each of the first classes from acoustic data derived from one or more samples of that class of speech sounds;
    the second class of speech sounds encompasses a plurality of speech units corresponding to a plurality of said first classes of speech sounds;
    a combined statistic is calculated for use in the acoustic model of each of said first classes which is a weighted combination of the second statistic and of the first statistic for that particular first class;
    the acoustic models from the plurality of first classes are then clustered together to divide them into a plurality of groups of relatively similar acoustic models; and
    acoustic models are calculated for each cluster.

8. A method as described in claim 1, wherein:
    the first class of speech sounds includes speech sounds spoken by one or more speakers from a smaller group of speakers than a larger group of speakers by whom speech sounds in the second class of speech sounds are spoken.

9. A method as described in claim 8, wherein both the first and second statistic are measurements of central tendency.

10. A method as described in claim 8, wherein both the first and second statistic are measurements of spread.

11. A method as described in claim 8 for deriving acoustic models of a first class of speech sounds, wherein:
    said first class of speech sounds corresponds to one speech unit, as that speech unit is spoken by said smaller group of speakers; and
    said second class of speech sounds corresponds to the same speech unit as spoken by said larger group of speakers.

12. A method as described in claim 1, wherein:
    the first and second statistic are both measurements of spread;
    the first statistic is derived from fewer samples than said second statistic.

13. A method as described in claim 12, wherein:

said method further includes calculating an estimate of the spread of the individual measurements of spread of the first statistic; and the contribution of the first statistic in the calculation of the combined statistic relative to the contribution of the second statistic is monotonically decreasing function of said estimate of spread.

14. A method as described in claim 13, wherein the estimate of spread is calculated by a method that causes that estimate to vary as an inverse monotonic function of the number of samples from which the first statistic is calculated.

15. A method as described in claim 12, wherein:

the second class of speech sounds includes a plurality of sub-classes of speech sounds;

an individual measurement of spread is calculated for each of these sub-classes;

a measurement of spread is calculated for the individual measurements of spread calculated for these sub-classes;

the contribution of the second statistic in the calculation of the combined statistic relative to the contribution of the first statistic is a monotonically decreasing function of the measurement of spread of the individual measurements of spread of the sub-classes of the second class of speech sounds.

16. A method as described in claim 15, wherein the first class is the ith sub-class of the second class, for a given value of i, and wherein the calculation of said combined statistic is calculated according to the formula:

$$\text{comb\_est\_sigma}_i = \frac{\text{est\_sigma}_i/\text{est\_variance}_i + \text{est\_prior\_sigma}/(\text{est\_gamma})^2}{1/\text{est\_variance}_i + 1/(\text{est\_gamma})^2}$$

in which:

comb_est_sigma$_i$ is the combined statistic, which is an estimate of the measurement of spread for the acoustic model of the first class of speech sounds;

est_sigma$_i$ is the first statistic, which is an estimate of the measurement of spread derived from the samples of the first class of speech sounds;

est_variance$_i$ is the estimate of variance of est_sigma$_i$;

est_prior_sigma is the estimated prior sigma, which is an estimate of the measurement of spread for the second class of speech sounds; and est_gamma is the estimated variance of the spreads of the subclass i.

17. A method as described in claim 16, wherein said est_variance$_i$ is calculated according to the following formula:

$$\text{est\_variance}_i = K[\text{comb\_est\_sigma}_i]^2/n_i$$

in which

K is a constant and;

$n_i$ is the number of samples from the ith sub-class used to calculate comb_est_sigma$_i$.

18. A method as described in claim 16, wherein said est_prior_sigma is calculated according to the following formula:

$$\text{est\_prior\_sigma} = [1/N](\text{sum}_i(n_i * \text{est\_sigma}_i))$$

in which sum$_i$ means the sum of the expression in the following parentheses over all values of i;

$n_i$ is the number of samples from the ith sub-class used to calculate comb_est_sigma$_i$; and N is the sum$_i$ ($n_i$).

19. A method as described in claim 16, wherein said est_gamma is calculated according to the following formula:

est_gamma = the square root of the following expression:

$$\frac{\text{sum}_i[n_i * (\text{est\_sigma}_i - \text{est\_prior\_sigma})^2] - m*K*(\text{est\_prior\_sigma}^2)}{N + mK}$$

in which:

sum$_i$ means of the expression in the following parentheses over all values of i;

$n_i$ is the number of samples from the ith sub-class used to calculate comb_est_sigma$_i$;

m is the number of sub-class in the second class of speech sounds for which est_prior_sigma is calculated;

K is a constant; and

N is the sum$_i$ ($n_i$).

20. A method as described in claim 1, wherein:

the acoustic model has a plurality of dimensions a separate first statistic is calculated for each of said dimensions from acoustic data derived from one or more samples of the first class of speech sounds;

a separate second statistic is calculated for each of said dimensions from acoustic data derived from samples of a the second class of speech sounds; and a combined statistic is calculated for each of said dimensions and is used in said acoustic model.

21. A method as described in claim 17, wherein each of a plurality of said dimensions relate to acoustic energy within a given frequency band.

22. A method as described in claim 1, wherein the first and second statistic relate to the duration of speech sounds.

23. A method of deriving an acoustic model of each of a plurality of speech units as spoken by a first group of speakers, which acoustic models are to be compared against a portion of speech to be recognized to determine the likelihood that the portion of speech corresponds to those speech units, said method including:

having the one or more speakers from said first group speak one or more utterances of one or more vocabulary words;

generating a sequence of acoustic data representing each of such utterances;

time aligning the sequence of acoustic data from the utterances of a vocabulary word by said first group of speakers against an acoustic model of that vocabulary word which is comprised of a sequence of acoustic models representing the speech units normally contained in the word, each of which speech unit models includes a second statistic calculated from acoustic data derived from samples of its corresponding speech unit as spoken by a larger second group of speakers;

calculating a first statistic from the acoustic data time aligned against each of the acoustic models of a given speech unit;

calculating a combined statistic by taking a weighted combination of the first and second statistic for that speech unit; and using said combined statistic as at least a part of said acoustic model of said speech unit.

24. A method as in claim 23, wherein:

the small group of speakers speak utterances of a first group of vocabulary words and the method is used to calculate a combined statistic for each of a plurality of speech units occurring in the acoustic models of that group of vocabulary words;

the combined statistic calculated for a given speech unit is used in the acoustic representation of vocabulary words in a second group of vocabulary words outside said first group, when the acoustic representations of those words in that second group are compared against portions of speech to be recognized; and the second statistic used to calculate the combined statistic for a given speech unit is calculated from acoustic data derived from utterances of that speech unit in words outside the first group of vocabulary words.

* * * * *